March 9, 1948.　　　　G. K. GOULD　　　　2,437,252

MOVIE PROJECTOR CONTROL DEVICE

Filed Nov. 30, 1945　　　　3 Sheets-Sheet 1

Inventor
George K. Gould
Attorneys

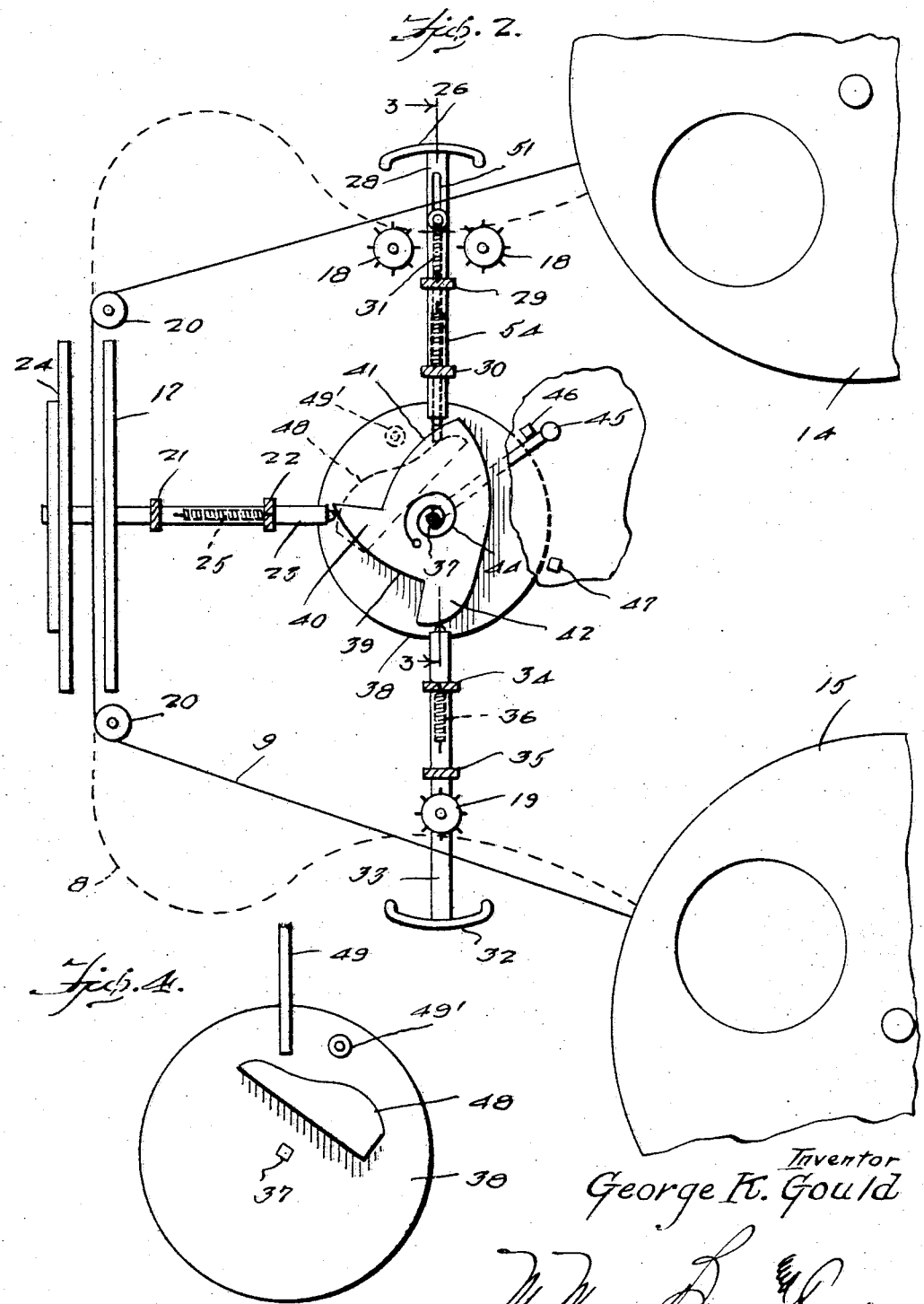

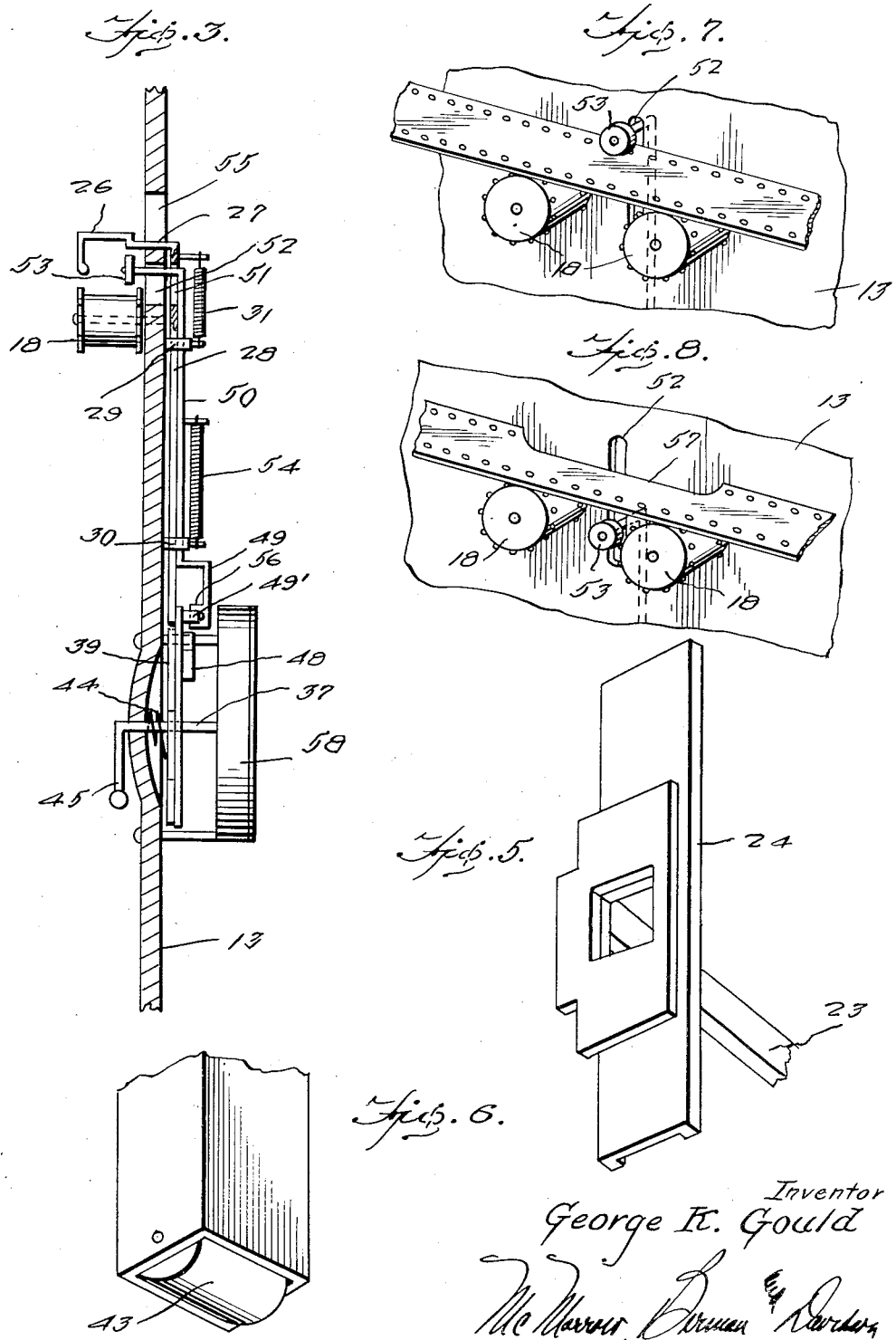

Patented Mar. 9, 1948

2,437,252

UNITED STATES PATENT OFFICE 2,437,252

MOVIE PROJECTOR CONTROL DEVICE

George K. Gould, Brooklyn, N. Y.

Application November 30, 1945, Serial No. 631,914

1 Claim. (Cl. 88—17)

This invention relates to control devices for motion picture projecting machines, and more particularly to a control device which will automatically deenergize the projector bulb, turn on house lights and rewind the film when the end of a reel has been reached.

A main object of the invention is to provide a novel and improved control device for motion picture projecting machines of simple construction and efficient operation which eliminates the necessity at the end of a reel for manually grasping the loose end of the film, catching it in the center slot of the rewind spool and then switching on the rewind mechanism.

A further object of the invention is to provide an improved automatic mechanism which automatically releases the film from its driving sprockets and performs the necessary switching operations to rewind the film at the end of a reel.

Further objects and advantages of the invention will become apparent from the following description and claim, and from the accompanying drawings, wherein:

Figure 2 is a detail longitudinal cross-sectional view of a portion of the projecting machine of Figure 1 showing the details of the control mechanism.

Figure 3 is a detail transverse cross-sectional view taken on line 3—3 of Figure 2.

Figure 4 is a detail view of the rear face of a cam disc employed in the control mechanism of this invention.

Figure 5 is a perspective detail view of a movable film gate member employed in the mechanism of this invention.

Figure 6 is a perspective detail view of the lower end of a cam follower rod employed in the mechanism.

Figure 7 is a perspective view of a trigger member employed in the control mechanism, shown in cocked position with respect to the film.

Figure 8 is a view similar to Figure 7 but showing the trigger member in released position.

Figure 1:
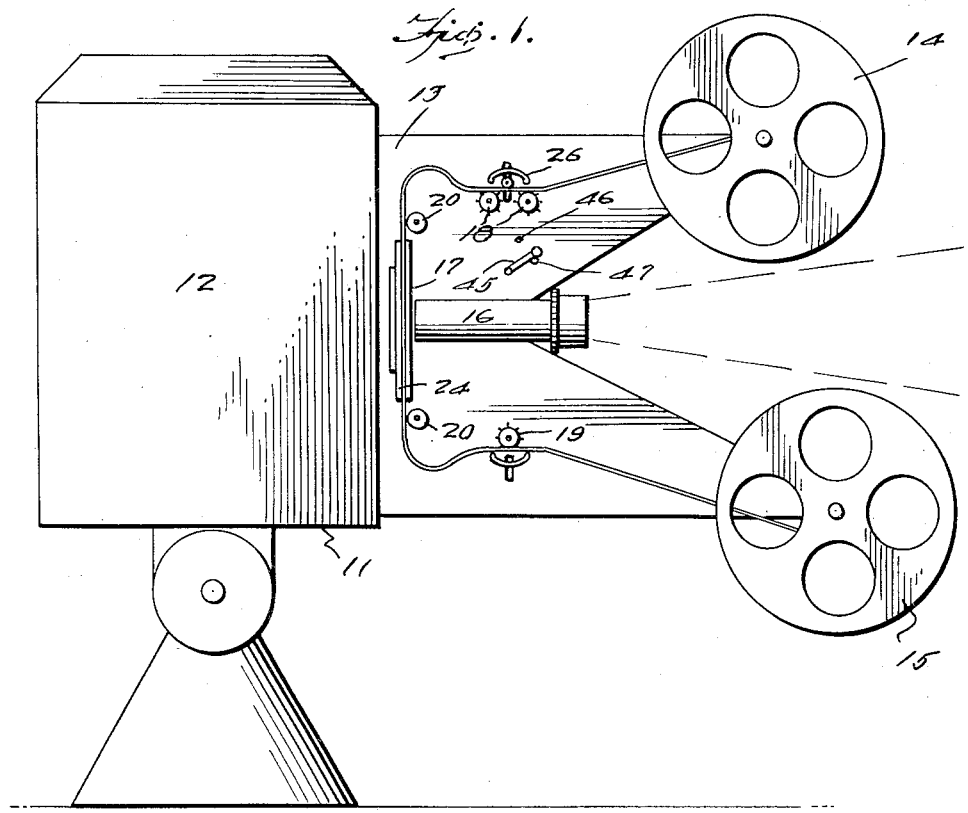
Figure 1 is a side elevational view of a motion picture projecting machine employing the control mechanism of the present invention.

Referring to the drawings, 11 designates a motion picture projector having a main housing 12 which contains the projector bulb. Secured to main housing 12 is a forwardly projecting auxiliary housing 13 located in a plane laterally offset from the central longitudinal plane of main housing 12 and defining upper and lower arms which respectively support the film carrying reel members 14 and 15, said reel members being suitably journaled in the arms and being driven by suitable reversible motor means, said motor means being adapted when a voltage of given polarity is applied thereto to drive the reels to unwind the film from one reel to the other as the film is being shown and being adapted in response to reversal of polarity to drive the reels in a reverse direction to rewind the film. The reversing motor and the unwinding and rewinding mechanism associated therewith are conventional and form no part of this invention except with regard to the switching control means for the rewinding operation subsequently to be described.

Supported by auxiliary housing 13 substantially in the central longitudinal plane of the projector is a horizontal lens housing 16 of conventional design and a stationary vertical film gate member 17 having an aperture registering with the aperture of the lens housing. Journaled in the walls of auxiliary housing 13 are a pair of upper sprocket wheels 18, 18 and a lower sprocket wheel 19. Located above and below gate member 17 are guide rollers 20, 20.

Slidably supported inside housing 13 in a pair of apertured lugs 21 and 22 carried by the inner wall surface of housing 13 is a horizontal bar member 23, said bar member carrying a vertical channel-shaped film engaging gate member 24 at its outer end, said gate member 24 being held in parallel position to stationary gate member 17, and being apertured to register with the aperture in the stationary gate member. A coil spring 25 connected between bar member 23 and inner lug 22 biases gate member 24 toward gate member 17 to thereby exert light guiding pressure on a film strip passing between the gate members, thus maintaining the film strip in correct vertical position with respect to the apertures in the gate members while the film is being shown.

During the unwinding of the film, that is, while it is being shown, the upper loop of the film strip is maintained in meshing engagement with upper sprocket wheels 18 by an overlying bearing member 26 which is carried by an arm 27 projecting through a vertical slot 55 in the wall of housing 13, said arm 27 being carried by a vertical bar member 28 which slidably passes through a pair of vertically aligned apertured guide lugs 29 and 30 carried by the inner wall surface of housing 13. A coil spring 31 secured between bar member 28 and the upper lug 29 biases the bar member to a downward position whereby bearing member 26 exerts light frictional pressure on the film strip, thus maintaining the film in meshing engagement with the sprocket wheels while the film is being shown. A lower bearing member 32 holds the bottom loop of the film strip in meshing engagement with lower sprocket wheel 19, said bearing member 32 being carried by a vertically slidable bar member 33 contained within housing 13 and slidably supported in a pair of vertically aligned apertured guide lugs 34 and 35 carried by the inner wall surface of housing 13. A coil spring 36 connected between bar member 33 and upper guide lug 34 biases lower bearing member 32 to film holding position.

Journaled transversely in housing 13 is a shaft element 37 secured to which is a circular disc member 38. Disc member 38 is formed on its front face with a cam 39. Cam 39 comprises a first riser portion 40, a second riser portion 41 and a third riser portion 42. Each of the bar members 23, 28 and 33 is formed with a recessed end portion in which is journaled a follower roller 43, as shown in Figure 6. The follower roller of bar member 23 engages riser portion 40, the follower roller of bar member 28 engages riser portion 41 and the follower roller of bar member 33 engages riser portion 42. Disc member 38 is biased in a counter-clockwise direction, referring to Figure 2, by a spiral spring 44 connected between cam element 39 and the adjacent wall surface of housing 13. In the position of the elements shown in Figure 2, shaft element 37 has been rotated counter-clockwise by spring 44 to move gate member 24 and bearing members 26 and 32 to film releasing positions by virtue of the cam action of the respective riser portions. Shaft element 37 is provided with an external handle portion 45 which is rotatable between a pair of stop lugs 46 and 47 for resetting the mechanism.

The rear face of disc member 38 is formed with a second cam 48 and carries a stop lug roller member 49' radially spaced outwardly of the intermediate portion of cam 48. Cooperating with cam 48 is a follower member 49 carried by a vertical rod element 50 which is slidably received in guide lugs 29 and 30 behind vertical bar member 28. The top end of rod element 50 is bent at right angles and projects outwardly through a vertical slot 51 in bar member 28 and a vertical slot 52 in the wall of housing 13, the outer end of the projecting arm carrying a roller element 53. Rod element 50 is biased downwardly by a coil spring 54 connected between guide lug 30 and said rod element. Follower member 49 is rearwardly offset at its lower portion and is formed with a detent lug element 56 adapted to interlock with stop roller 49' of cam disc 38 when the rod element 50 is in an intermediate raised position with respect to the cam 48. However said detent lug element 56 will pass beneath the stop roller 49' when the bottom end of the lug element is in contact with the camming surface of cam 48.

When a strip of film is positioned on sprockets 18, 18 as shown in Figure 7, roller 53 rests on the edge portion of the strip. This maintains detent lug 56 in an abutting position with respect to stop roller 49'. The portion of the film near the end of the reel is cut away, as shown at 57 in Figure 8. When this cut away portion of the film reaches roller 53, said roller is unsupported and drops below the film strip, thereby moving detent lug 56 downwardly out of engagement with stop roller 49' and releasing the cam disc 38. Therefore, referring now to Figure 2 where the cam disc is shown in released position, to reset the mechanism handle 45 is rotated clockwise from stop lug 46 to stop lug 47 causing cam 48 to raise rod member 50 until roller 53 is above sprocket wheels 18, 18, a new strip of film is inserted between roller 53 and the sprocket wheels 18, 18 in meshing engagement with the sprocket wheels, and handle 45 is then released. This holds detent lug 56 in blocking position with respect to stop roller 49' and cocks the cam disc 38. In the cocked position of cam disc 38, gate 24 and holding members 26 and 32 are in effective guiding contact with the film strip to hold the strip in proper position.

The resetting operation, of course, is performed after the previously shown reel has been rewound and removed and a new reel has been placed in position for unwinding. In Figure 2, the solid line 9 designates the film in rewinding position, whereas the dotted line 8 designates the film in position to be shown.

Supported within housing 13 and coaxial with shaft element 37 is a switch casing 58 formed preferably of insulating material into which shaft element 37 extends. Carried on shaft element 37 within casing 58 is a disc 59 of insulating material. Disc 59 carries at its periphery a plurality of spaced short circuiting bars 60, 61, 62, 63, 64 and 65. Positioned in casing 58 in wiping engagement with the periphery of disc 59 are a first pair of brushes 66, 67 connected to the house lighting lamp circuit. In the cocked position of shaft element 37 brushes 66 and 67 engage merely the insulating portion of disc 59. A second pair of brushes 68 and 69 are connected to the projector bulb. These brushes engage bars 62 and 63 respectively in the cocked position of disc 59. A third pair of brushes 70 and 71 are connected to the reversible motor. Of these, brush 70 is in engagement with conductor bar 65 of disc 59 when said disc is in cocked position, brush 71 engaging bar 64. A fourth pair of brushes 72 and 73 are connected to the power line, these brushes engaging bars 64 and 65 respectively when disc 59 is cocked. A fifth pair of brushes 74 and 75 engage bars 63 and 62 respectively when the disc is cocked, and these brushes are respectively connected to brushes 72 and 73 to thereby energize the projector bulb. A sixth pair of brushes 76 and 77 are provided, brush 76 being connected to brush 75 and engaging bar 61 in the cocked position of the disc 59, and brush 77 being connected to brush 73 and engaging the insulating portion of disc 59 in the cocked position thereof. It will be readily apparent from Figure 9 that in the cocked position of disc 59 the projector bulb is energized since brushes 68 and 69 respectively engage bars 62 and 63 which are electrically connected by brushes 75 and 74 to the power source. Also it will be seen that the house lights are deenergized.

Figure 9:
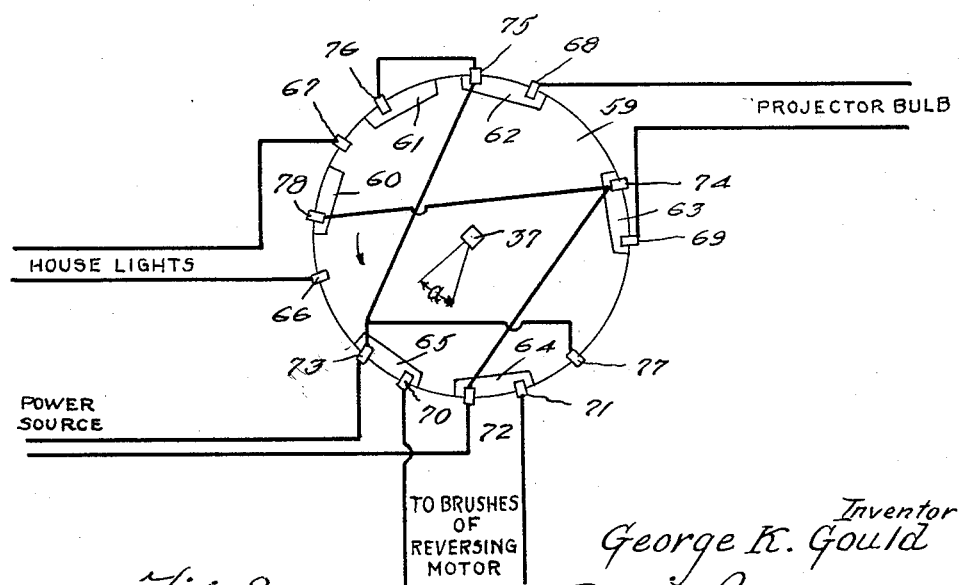
Figure 9 is a schematic view of a switching disc and electrical connections to brushes cooperating with said switching disc to control the switching of the elements as employed in the mechanism of this invention.

When the mechanism is automatically released at the end of a reel as above previously described, shaft 37 rotates counter-clockwise as seen in Figure 9 under the action of spring 44, through an angle a, disc 59 rotating accordingly through this angle. When this occurs conducting bar 60 connects brush 66 to a brush 78 which is connected to brush 74, and conductor bar 61 connects brush 67 to brush 76. This energizes the house light circuit. Similarly conductor bar 64 moves to a position bridging brushes 71 and 77, and conductor bar 65 moved to a position bridging brushes 70 and 72, thus reversing the polarity of the voltage applied to the motor. At the same time, conductor bars 62 and 63 move out of engagement with brushes 68 and 69, thus deenergizing the projector bulb.

The reversed motor rewinds the film, which when completely rewound, is removed and the next reel placed in position for unwinding.

While a specific embodiment of a control structure for motion picture projectors has been disclosed in the foregoing description it will be understood that various modifications within the spirit of the invention may occur to those skilled in the art. Therefore it is intended that no limitations be placed on the invention other than as defined by the scope of the appended claim.

What is claimed is:

In a motion picture projector, a first reel, a second reel, a film gate, means for supporting a film in projection position with respect to said film gate as it is being unwound from said first reel onto said second reel, a rewinding motor adapted to rewind said film from the second reel onto the first reel, a projection lamp for the projector, guide means for holding said film against said supporting means during the unwinding of the film, the film being cut away at its side portion adjacent the end of the reel being unwound, a member normally supported on said side portion, a detent lug carried by said member, an element including a cam and a handle device rotatively mounted with respect to said detent lug, a spring biasing said element to a first position, said cam being adapted to lift said member above the level of the film responsive to manual rotation of said element by said handle device against the tension of said spring, a stop lug carried by said element normally cooperating with said detent lug to maintain said element in a rotated position, said stop lug being formed and arranged to clear said detent lug during the coaction of said cam with said member, means responsive to the dropping of said member through the cut-away side portion of the film to disengage said detent lug from said stop lug whereby to release said element, and means responsive to the return of said element to its first position for simultaneously de-energizing said projection lamp, moving said guide means out of holding position with respect to the film and energizing said rewinding motor.

GEORGE K. GOULD.

REFERENCES CITED

The following references are of record in the file of this patent:

UNITED STATES PATENTS

| Number | Name | Date |
| --- | --- | --- |
| 1,943,303 | Foster | Jan. 16, 1934 |
| 2,009,442 | Foster et al. | July 30, 1935 |
| 2,051,787 | Foster | Aug. 18, 1936 |
| 1,468,499 | Frangos | Sept. 18, 1923 |
| 2,049,944 | Carpenter | Aug. 4, 1936 |
| 2,051,036 | Foster et al. | Aug. 18, 1936 |

FOREIGN PATENTS

| Number | Country | Date |
| --- | --- | --- |
| 148,744 | Great Britain | Dec. 2, 1920 |
| 150,298 | Great Britain | Dec. 30, 1920 |